US011278874B2

(12) United States Patent
Cauffman et al.

(10) Patent No.: US 11,278,874 B2
(45) Date of Patent: Mar. 22, 2022

(54) ENHANCED INTRODUCTION OF EXTRA-FRAMEWORK METAL INTO ALUMINOSILICATE ZEOLITES

(71) Applicant: JOHNSON MATTHEY PUBLIC LIMITED COMPANY, London (GB)

(72) Inventors: Scott Cauffman, Wayne, PA (US); Hai-Ying Chen, Wayne, PA (US); Joseph Fedeyko, Wayne, PA (US); Duncan Winterborn, Royston (GB)

(73) Assignee: Johnson Matthey Public Limited Company, London (GB)

( * ) Notice: Subject to any disclaimer, the term of this patent is extended or adjusted under 35 U.S.C. 154(b) by 99 days.

(21) Appl. No.: 16/699,044

(22) Filed: Nov. 28, 2019

(65) Prior Publication Data

US 2020/0171473 A1 Jun. 4, 2020

Related U.S. Application Data

(60) Provisional application No. 62/773,501, filed on Nov. 30, 2018.

(51) Int. Cl.

| B01J 29/06 | (2006.01) |
|---|---|
| B01J 29/76 | (2006.01) |
| B01D 53/94 | (2006.01) |
| B01J 29/78 | (2006.01) |
| B01J 37/02 | (2006.01) |
| B01J 37/04 | (2006.01) |
| B01J 37/30 | (2006.01) |
| B01D 39/06 | (2006.01) |
| B01J 29/72 | (2006.01) |
| B01J 35/04 | (2006.01) |
| B01J 29/74 | (2006.01) |
| B01J 29/076 | (2006.01) |
| B01J 29/068 | (2006.01) |
| B01J 29/072 | (2006.01) |
| B01J 29/064 | (2006.01) |

(52) U.S. Cl.
CPC ............ B01J 29/763 (2013.01); B01D 39/06 (2013.01); B01D 53/9418 (2013.01); B01J 29/061 (2013.01); B01J 29/064 (2013.01); B01J 29/068 (2013.01); B01J 29/072 (2013.01); B01J 29/076 (2013.01); B01J 29/72 (2013.01); B01J 29/723 (2013.01); B01J 29/74 (2013.01); B01J 29/743 (2013.01); B01J 29/76 (2013.01); B01J 29/78 (2013.01); B01J 29/783 (2013.01); B01J 35/04 (2013.01); B01J 37/0201 (2013.01); B01J 37/0215 (2013.01); B01J 37/04 (2013.01); B01J 37/30 (2013.01); B01D 2255/2073 (2013.01); B01D 2255/20761 (2013.01); B01D 2255/50 (2013.01); B01J 2229/18 (2013.01); B01J 2229/183 (2013.01); B01J 2229/38 (2013.01)

(58) Field of Classification Search
CPC ...... B01J 29/061; B01J 29/064; B01J 29/068; B01J 29/072; B01J 29/076; B01J 29/72; B01J 29/723; B01J 29/74; B01J 29/743; B01J 29/76; B01J 29/763; B01J 29/78; B01J 29/783; B01J 35/04; B01J 37/04; B01J 37/0201; B01J 37/0215; B01J 37/30; B01J 2229/18; B01J 2229/183; B01D 39/026; B01D 2255/2073; B01D 2255/20761; B01D 2255/50; B01D 53/9418; B01D 39/06
USPC ......... 502/60, 63, 64, 69, 66, 74, 75, 85, 86
See application file for complete search history.

(56) References Cited

U.S. PATENT DOCUMENTS

| 7,601,662 B2 | 10/2009 | Bull et al. | |
|---|---|---|---|
| 2011/0165052 A1 | 7/2011 | Beutel et al. | |
| 2013/0272937 A1 | 10/2013 | Tokunaga et al. | |
| 2014/0112853 A1 | 4/2014 | Mohanan et al. | |
| 2015/0217282 A1* | 8/2015 | Fedeyko ................ | B01D 53/58 423/213.5 |

(Continued)

FOREIGN PATENT DOCUMENTS

| CN | 107537551 A | 1/2018 |
|---|---|---|
| WO | 2008077590 A2 | 7/2008 |

(Continued)

OTHER PUBLICATIONS

Dedecek, et al., "Siting of the Cu+ Ions in Dehydrated Ion Exchanged Synthetic and Natural Chabasites: a Cu+ Photoluminescence Study"; Micro and Meso Mat 32 (1999) 63-74.

*Primary Examiner* — Elizabeth D Wood (57) ABSTRACT

A process for the preparation of an extra-framework metal-containing aluminosilicate zeolite involves the steps of: (a) forming a reactant mixture A comprising (i) an aqueous slurry of an aluminosilicate zeolite in a $H^+$-form, and (ii) a metal containing compound or free metal, wherein the mixture does not comprise ammonia, ammonium hydroxide or an ammonium salt, and (b) reacting the metal containing compound or free metal with the aluminosilicate zeolite in a $H^+$-form in reactant mixture A and forming a product mixture B, a reaction mixture comprising the extra-framework metal-containing aluminosilicate zeolite. The metal comprises one or more of copper, iron, manganese, nickel and palladium. The step of reacting the metal with the aluminosilicate zeolite in a $H^+$-form is performed in a single exchange. The extra-framework metal-containing aluminosilicate zeolite can then be used directly in forming a washcoat that can be applied to a support.

21 Claims, 2 Drawing Sheets

(56) References Cited

U.S. PATENT DOCUMENTS

| | | | |
|---|---|---|---|
| 2015/0238944 A1* | 8/2015 | Narula | B01J 37/009 |
| | | | 502/73 |
| 2015/0238947 A1* | 8/2015 | Casci | B01J 35/0006 |
| | | | 502/66 |
| 2016/0129431 A1 | 5/2016 | Bull et al. | |
| 2016/0236417 A1* | 8/2016 | Rothenberg | B33Y 50/00 |
| 2016/0367941 A1* | 12/2016 | Gilbert | F01N 3/106 |
| 2017/0095804 A1 | 4/2017 | Janssens et al. | |
| 2017/0144105 A1* | 5/2017 | Chandler | B01J 29/072 |
| 2017/0182482 A1* | 6/2017 | Blakeman | B01J 35/0006 |
| 2018/0117573 A1* | 5/2018 | Fedeyko | F01N 3/2066 |
| 2018/0297014 A1* | 10/2018 | Mohanan | B01J 23/10 |
| 2018/0297016 A1* | 10/2018 | Blakeman | F01N 3/2842 |
| 2019/0224657 A1* | 7/2019 | Fedeyko | F01N 3/10 |
| 2020/0316573 A1* | 10/2020 | Goffe | B01J 35/023 |

FOREIGN PATENT DOCUMENTS

| | | |
|---|---|---|
| WO | 2008106519 A1 | 9/2008 |
| WO | 2008132452 A2 | 11/2008 |
| WO | 2009051353 A2 | 4/2009 |
| WO | 2011064186 A1 | 6/2011 |
| WO | 2013079954 A1 | 6/2013 |
| WO | 2017211236 A1 | 12/2017 |
| WO | 2017211237 A1 | 12/2017 |

* cited by examiner

ENHANCED INTRODUCTION OF EXTRA-FRAMEWORK METAL INTO ALUMINOSILICATE ZEOLITES

FIELD OF THE INVENTION

The invention relates to processes of manufacturing extra-framework metal-containing aluminosilicate zeolites by ion-exchanging metal ions into the $H^+$-form of the aluminosilicate zeolite in a single step and the reaction mixture formed can be used to form a washcoat. The method is different than traditional ion-exchange methods where the reaction mixture is separated from the metal-containing aluminosilicate that is formed, and the metal-containing aluminosilicate is washed with water, generally in repeated steps to remove impurities from the metal-containing aluminosilicate.

BACKGROUND OF THE INVENTION

Aluminosilicate zeolites are crystalline aluminosilicate materials having rather uniform pore sizes which, depending upon the type of zeolite, the location of the cations, the type of cations and the number of cations included in the zeolite, generally range from about 3 to 10 Angstroms in diameter.

The use of synthetic zeolites in promoting certain reactions, such as the selective catalytic reduction (SCR) of nitrogen oxides with a reductant such as ammonia, urea and/or hydrocarbon in the presence of oxygen, are well known in the art.

The processes of synthesizing a zeolite can vary according to framework structure of the zeolite. Zeolites are usually synthesized using a structure directing agent (also referred to as a template or organic template) together with sources of silica and alumina. The structure directing agent can be in the form of an organic compound, e.g., tetraethylammonium hydroxide (TEAOH), or inorganic cation, e.g., $Na^+$ or $K^+$. During crystallization, the tetrahedral silica-alumina units become organized around the structure directing agent (SDA) to form the desired framework, and the SDA is often contained within the pore structure of the zeolite crystals.

It has been found that the introduction of an extra-framework metal into the aluminosilicate zeolite can improve the catalytic activity of the aluminosilicate zeolite. Researchers have described a variety of methods for introducing various metals into a number of molecular sieves.

Dedecek et al. (Microporous and Mesoporous Materials 32 (1999) 63-74) investigated the direct exchange of copper into $Na^+$—, $Ca^{2+}$—, $Cs^+$—, and $Ba^{2+}$-forms of chabazite. The single exchange process produced materials having a Cu/Al ratio of 0.01 to 0.28. In the examples where two ion exchanges were performed, the material produced having a Cu/Al ratio of 0.34, 0.38 and 0.32.

WO 2008/077590 describes a process of direct metal exchange of iron, copper and/or silver into the $Na^+$ form of a zeolite having an MFI or BEA structure, where the metal-exchange is performed by suspending a zeolite in an aqueous solution which comprises metal ions and ammonium ions.

WO 2008/106519 (U.S. Pat. No. 7,601,662) discloses a catalyst comprising a zeolite having the CHA crystal structure, that was prepared via copper exchanging the $NH_4^+$-form of CHA with copper sulfate or copper acetate. The process of ion-exchange, filtering, washing and drying was performed at least twice (repeated at least once). Some examples used multiple ion-exchange, filtering, washing and drying steps, with these steps performed up to 5 times. In some examples a coating slurry comprising a calcined CuCHA catalyst was treated with additional copper sulphate to increase the total level of CuO. In one example, a CuCHA catalyst comprising 1.94% CuO was prepared by a single ion-exchange, but details of the exchange were not provided.

WO 2008/132452 discloses that various small pore $NH_{4+}$ zeolites (SAPO-34, SSZ-13, Sigma-1, ZSM-34, ZSM-5) and Beta (a large pore zeolite) can be ion-exchanged with a transitional metal. It was disclosed that the procedure can be repeated to achieve a desired metal loading that is higher than the metal loading obtained by a single ion-exchange. According to the Examples. multiple aqueous ion-exchanges may be needed to achieve the desired loading of 3 wt % Cu.

US 2011/0165052 discloses a method of preparing CuCHA by ion-exchange of copper into the $Na^+$-form or the $NH_4$-form of CHA.

US 2017/0095804 discloses a method for the preparation of metal-exchange zeolites by providing a dry mixture of (a) one or more microporous zeotype materials that exhibit ion exchange capacity and (b) one or more metal compounds; heating the mixture in a gaseous atmosphere containing ammonia to a temperature lower than 300° C. for a time sufficient to initiate and perform a solid state ion exchange of ions of the metal compound and ions of the zeolite material. Also disclosed is the benefits of using solid state ion exchange over conventional methods where a zeolite is contacted with a solution of the desired metal ion.

U.S. Pat. No. 8,795,626 relates to chabazite-type zeolites having copper and an alkali earth metal supported thereon. One example, Cu was exchanged into the $H^+$-form of the zeolite using conventional ion-exchange where after the reaction, the solid was separated from the liquid, washed and dried, before the alkali earth metal was exchanged into the CuCHA.

Unfortunately, achieving the desired metal loadings can involve inefficient and wasteful procedures. There is an on-going desire to simplify the process of preparing metal-containing aluminosilicates as this process contains many processing steps adding capital and operating cost to the manufacturing process.

SUMMARY OF THE INVENTION

A process for the preparation of an extra-framework metal-containing aluminosilicate zeolite comprises: (a) forming a reactant mixture A comprising (i) an aqueous slurry of an aluminosilicate zeolite in a $H^+$-form, and (ii) a metal containing compound or free metal, wherein the mixture does not comprise ammonia, ammonium hydroxide or an ammonium salt; and (b) reacting the metal in the metal containing compound or free metal with the aluminosilicate zeolite in a $H^+$-form in reactant mixture A and forming a product mixture B, comprising the extra-framework metal-containing aluminosilicate zeolite, wherein the step of reacting the metal with the aluminosilicate zeolite in a $H^+$-form is performed in a single exchange and after forming product mixture B, the extra-framework metal-containing aluminosilicate zeolite is not separated from product mixture B.

A process for the preparation of a washcoat comprising an extra-framework metal-containing aluminosilicate zeolite comprises: (a) providing a product mixture B comprising an extra-framework metal-containing aluminosilicate zeolite according to the processes described herein; and (b) combining product mixture B, a reaction mixture comprising the extra-framework metal-containing aluminosilicate zeolite with a binder, a rheology modifier, or a mixture of a binder and a rheology modifier to form washcoat mixture C.

There are several advantages of the methods described herein over the current state of the art in terms of efficiency, waste stream minimization, and a reduction in required steps. This can reduce energy usage while providing improved throughput of articles produced using the extra-framework metal-containing aluminosilicate zeolite. Product mixture B, comprising the metal incorporated into the aluminosilicate zeolite, can be directly used in forming a washcoat, without having to: (a) remove water and unwanted reaction products from the product mixture B, (b) wash or further treat the extra-framework metal-containing aluminosilicate zeolite; and/or (c) calcining the metal incorporated into the aluminosilicate zeolite.

This allows for increased productivity as well as both energy and material savings because the overall process has been simplified so that reaction mixture does not have to be washed to remove metal that has not been incorporated into the aluminosilicate zeolite and water does not need to be removed. It also removes the need for two calcination steps, one when the extra-framework metal-containing aluminosilicate zeolite is made and a second after the washcoat is placed on a substrate. The methods described herein allow for the calcination step to removed when the extra-framework metal-containing aluminosilicate zeolite is made. It allows for capital expenditure savings for separate drying and calcination equipment and working capital savings due to lower work-in-progress inventory.

DETAILED DESCRIPTION OF THE INVENTION

As used herein, the singular forms "a", "an" and "the" include plural referents unless the context clearly indicates otherwise. Thus, for example, reference to "a catalyst" includes a mixture of two or more catalysts, and the like.

The term "about" means approximately and refers to a range that is optionally ±25%, preferably ±10%, more preferably, ±5%, or most preferably ±1% of the value with which the term is associated.

When a range, or ranges, for various numerical elements are provided, the range, or ranges, includes the values, unless otherwise specified.

The term "metal", as used herein, refers to the copper, iron, manganese, nickel and/or palladium that is being exchanged into, or located on, the aluminosilicate zeolite. The term "metal containing compound or free metal" as used herein refers to the metal as being a cation in a salt of the metal, an oxide or a free metal. When the metal is present as a cation, the metal can be in solution in the form of a salt comprising the metal as a cation along with an anion.

The term "$H^+$-form" of an aluminosilicate zeolite refers an aluminosilicate zeolite with the framework charge substantially balanced by protons. In this form, the aluminosilicate zeolite generally contains a mixture of $H^+$ and alkali and/or alkaline earth cations in the exchange sites. The $H^+$ form of an aluminosilicate zeolite can be ≥90%, ≥95%, ≥96%, ≥97%, ≥98%, or ≥99% in $H^+$-form. The amount of the aluminosilicate zeolite in $H^+$-form can vary depending on the specific aluminosilicate zeolite batch and the method used to form the aluminosilicate zeolite.

The term "extra-framework metal-containing aluminosilicate zeolite" refers to an aluminosilicate zeolite in which the metal is on the surface of and/or within the cages and/or pores of the aluminosilicate zeolite. It does not refer to aluminosilicates in which the metal is in the aluminosilicate framework.

A pore is an opening that goes from one side of a crystal to another side of the crystal but is not straight. A cage is a polyhedral pore whose windows, faces of the polyhedral pore, are too narrow to be penetrated by molecules larger than water. This means that the window of a cage has a maximum size of a 6-member ring.

When the metal is a cation of a salt, the term "reacting" refers to the ion-exchange of the metal into the zeolite. When the metal is a metal oxide or a free metal, the term "reacting" refers to the movement of the metal oxide or free metal onto and/or into the zeolite.

When the metal is a cation of a salt, the term "product mixture C" means the mixture formed after the metal exchange with the aluminosilicate zeolite" occurs and the "extra-framework metal-containing aluminosilicate zeolite" is formed. This metal exchange can be an ion-exchange. The reactant mixture includes the "extra-framework metal-containing aluminosilicate zeolite", all reaction products present in the mixture and the water. When the metal is a free metal or an oxide of the metal, the term "product mixture C" means the mixture formed after the metal or an oxide of the metal moves into extra-framework sites in the aluminosilicate zeolite.

The term "calcine", or "calcination", means heating the material in air, oxygen or an inert atmosphere. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook.) Calcination is performed to decompose a metal salt and promote the exchange of metal ions within the catalyst and also to adhere the catalyst to a substrate. The temperatures used in calcination depend upon the components in the material to be calcined and generally are between about 400° C. to about 900° C. for approximately 0.25 to 8 hours. In some cases, calcination can be performed up to a temperature of about 1200° C. In applications involving the processes described herein, calcinations are generally performed at temperatures from about 400° C. to about 700° C. for approximately 0.25 to 8 hours, preferably at temperatures from about 400° C. to about 650° C. for approximately 0.25 to 4 hours.

The term "washcoat" means a carrier for the catalytic materials that is used to disperse the materials over a large surface area on a substrate. The catalytic materials are suspended in the washcoat prior to applying the washcoat to the substrate.

The term "comprising," which is synonymous with "including," "containing," or "characterized by," is inclusive or open-ended and does not exclude additional, unrecited elements or method steps.

The term "consisting essentially of", as used herein, limits the scope of a feature to include the specified material(s), step(s) and any other materials or steps that do not materially affect the basic characteristics of that feature, such as for example minor impurities. The expression "consist essentially of" embraces the expression "consisting of".

The term "consisting of" excludes any element, step, or ingredient not specified in the claim.

Described herein is a process for the preparation of extra-framework metal-containing aluminosilicate zeolites. The process for manufacturing extra-framework metal-containing aluminosilicate zeolites described herein can be performed using either batch tank or continuous process manufacturing. An extra-framework metal-containing aluminosilicate zeolite obtained or obtainable by the process of the present invention can be processed and used as described in the literature for other extra-framework metal-containing aluminosilicate zeolites. The as-prepared extra-framework metal-containing aluminosilicate zeolite can also be directly incorporated into a washcoat as part of a process that both forms the extra-framework metal-containing aluminosilicate zeolite and forms a washcoat which is then applied to a substrate.

1. Process of Incorporating Metal into Extra-Framework Sites in an Aluminosilicate Zeolite A process for the preparation of an extra-framework metal-containing aluminosilicate zeolite comprises the steps of:

(a) forming a reactant mixture A comprising (i) an aqueous slurry of an aluminosilicate zeolite in a $H^+$-form, and (ii) a metal containing compound or free metal, wherein the mixture does not comprise ammonia, ammonium hydroxide or an ammonium salt, and (b) reacting the metal with the aluminosilicate zeolite in a $H^+$-form in reactant mixture A and forming a product mixture B, a reaction mixture comprising the extra-framework metal-containing aluminosilicate zeolite, wherein the metal comprises one or more of copper, iron, manganese, nickel and palladium; and the step of reacting the metal with the aluminosilicate zeolite in a $H^+$-form is performed in a single exchange and after forming product mixture B, the extra-framework metal-containing aluminosilicate zeolite is not separated from product mixture B.

Step (a) Forming Reactant Mixture a Comprising (i) an Aqueous Slurry of an Aluminosilicate Zeolite in a $H^+$-Form, and (ii) a Metal Containing Compound or Free Metal, Wherein the Mixture does not Comprise Ammonia, Ammonium Hydroxide or an Ammonium Salt The term aluminosilicate zeolite, as used herein, encompasses aluminosilicate zeolites having any one of the framework structures listed in the Database of Zeolite Structures published by the International Zeolite Association (IZA). Zeolites have a three dimensional framework of interconnected tetrahedra comprising aluminum, silicon and oxygen atoms, where all four oxygen atoms located at corners of each tetrahedron are shared with adjacent tetrahedral crystals. The non-oxygen atoms in the tetrahedron are referred to as T atoms.

The aluminosilicate zeolite can be a small pore, medium pore or large pore aluminosilicate zeolite, or combinations thereof. Small pore aluminosilicate zeolites typically have pores defined by a ring of no more than 8 T atoms and have an average pore size less than about 0.5 nm (5 Å). Medium pore aluminosilicate zeolites typically have pores defined by a ring of 10 T atoms and have an average pore size about 0.5 to 0.6 nm (5 to 6 Å), whereas large pore materials have pores defined by rings of 12 or more T atoms and a pore size greater than 0.6 nm (6 Å).

A small pore aluminosilicate zeolite can be selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, KFI, LEV, LTA, MER, MON, NSI, OWE, PAU, PHI, RHO, RTH, SAT, SAV, SFW, SIV, THO, TSC, UEI, UFI, VNI, YUG, and ZON, and mixtures and/or intergrowths thereof. Preferably the small pore aluminosilicate zeolite is selected from the group of Framework Types consisting of AEI, AFT, AFX, CHA, DDR, ERI, KFI, LEV, LTA, SFW and RHO.

A medium pore aluminosilicate zeolite can be selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, -SVR, SZR, TER, TON, TUN, UOS, VSV, WEI, and WEN, and mixtures and/or intergrowths thereof. Preferably, the medium pore aluminosilicate zeolite is selected from the group of Framework Types consisting of FER, MEL, MFI, STI and STT.

A large pore aluminosilicate zeolite can be selected from the group of Framework Types consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, and VET, and mixtures and/or intergrowths thereof. Preferably, the large pore molecular sieve is selected from the group of Framework Types consisting of AFI, BEA, GME, MAZ, MOR and OFF.

The aluminosilicate zeolite preferably comprises a Framework Type selected from the group consisting of: AEI, AFT, AFX, BEA*, CHA, DDR, ERI, FAU, FER, GME HEU, ITE, KFI, LEV, LTA, MFI, MWW, RHO, RTH, SFW, *SFV, STT, SZR and UFI, and intergrowths and mixtures thereof.

The aluminosilicate zeolite can have a silica/alumina molar ratio (SAR), defined as $SiO_2/Al_2O_3$, of 5 to 50, preferably 8 to 40, more preferably 10 to 35, and even more preferably 13 to 25.

The aluminosilicate zeolite can have a particle size distribution that is the same as the desired particle size distribution of the extra-framework metal-containing aluminosilicate zeolite formed. Alternatively, the aluminosilicate zeolite can have a particle size distribution that can be treated, such as by jet milling, wet milling or steam assisted jet-milling so that the metal-containing aluminosilicate zeolite has the desired particle size distribution. Wet milling can be performed in a recirculation chamber mill or a basket-type immersion mill. Both wet mills use beads as the attrition media. Jet milling utilizes a high velocity jet of compressed air to impact particles into one another to cause attrition.

The aluminosilicate zeolite can be treated before being used in step (a) to change one or more of the properties of the aluminosilicate zeolite. For example, the treatment can change the particle size or the particle size distribution of the aluminosilicate zeolite. The acidity of the aluminosilicate zeolite may be changed by washing the aluminosilicate zeolite with, for example, an acid or EDTA. The aluminosilicate zeolite can be subject to other forms of dealumination including hydrothermal treatment.

H+ Form of Aluminosilicate Zeolite

Step (a) requires an aluminosilicate zeolite in a H+-form. Applicants have discovered that the use of an aluminosilicate zeolite in a H+-form allows for the use of a single extra-framework metal exchange that provides higher levels of metal uptake than the use of $NH_3$-forms of an aluminosilicate zeolite. This is shown below in Examples 1 and 2.

Reactant mixture A can comprise between 5% to 50%, preferably 10% to 45%, more preferably 20% to 45%, of the aluminosilicate zeolite in a H+-form. Reactant mixture A can be a slurry or s suspension, preferably a slurry.

Metal

The metal can comprise one or more of copper, iron, manganese, nickel and palladium, preferably one or more of copper, manganese, nickel and palladium.

The metal can comprise a combination of one or more of copper, manganese, nickel and palladium with iron.

The loading of the metal in the extra-framework metal-containing aluminosilicate zeolite can be ≥0.1% and ≤10% by weight, preferably ≥0.1% and ≤7% by weight, more preferably ≥0.1% and ≤5% by weight, relative to the amount of aluminosilicate zeolite.

Salts of the Metal

Step (a) can use one or more salts of the metal. A salt of the metal requires a metal cation and an anion.

Various salts, or mixtures of salts, of the metal, can be used. Preferably the salts of the metal do not form complexes with other materials during the metal exchange. Preferably at least one of the salts of the metal is soluble in an acidic aqueous solution (pH≤5). A combination of a soluble and non-acidic aqueous soluble (pH≥7) salt of the metal can be used. The salts of the metal can preferably comprise one or more of the following anions: acetate, bromide, carbonate, chloride, citrate, fluoride, formate, hydroxide, iodide, nitrate, oxalate, phosphate and sulfate, or a combination thereof.

The one or more salts of the metal can comprise two salts and the anions of these salts can be selected from acetate, formate and hydroxide.

The salt of the metal can be soluble in water or can be a physical mixture of the salt of the metal, such as a slurry or a suspension.

Metal Concentration in Reactant Mixture A

The metal containing compound or free metal can be present in a solution, slurry or suspension having a concentration of the metal that achieves a desired loading of the metal in the aluminosilicate zeolite in a single ion-exchange. When the metal containing compound is soluble in water, the desired loading can be based on the uptake of the metal, as determined by the difference between the concentration of the metal in a sample of a supernatant from product mixture B, the reaction mixture after the exchange reaction has occurred, and the concentration of the metal in a sample of a supernatant from reactant mixture A before the reaction has occurred. Supernatant samples can be obtained for analysis by centrifuging a portion of reactant mixture A and product mixture B to separate the solid from the liquid. The difference between that amount of the metal in reactant mixture A and product mixture B corresponds to the amount of metal exchanged into extra-framework sites of the zeolite. When the metal is a free metal or in the form of a metal containing compound that is not soluble in water but is present in a slurry or suspension, samples of reactant mixture A and product mixture B may need to be analyzed in a manner that solubilizes the metal while not removing the metal from the extra-framework sites of the zeolite.

The metal containing compound can be present in a solution, a suspension or a slurry, depending upon water solubility and concentration of the metal containing compound. The concentration of the metal needs to be at a level that achieves the desired loading of the metal in the aluminosilicate zeolite in a single step. The concentration of the metal in solution can vary over a wide range depending upon solubility of the metal containing compound in water, the presence of other water soluble materials, the concentration of extra-frame metal-containing aluminosilicate zeolite needed in washcoat mixture C, which is used as, or to form, a washcoat. The concentration of the metal containing compound in water at the temperature of the formation of reactant mixture A or the temperature of the reaction to form product mixture B, a reaction solution, can range from 0.1 to 2.5 molar, preferably from 0.5 to 2 molar, more preferably from 0.1 to 1 molar, even more preferably from 0.2 to 0.5 molar.

The metal containing compound or metal can be present in a solution, a suspension or a slurry, depending upon water solubility and concentration of the metal containing compound or metal. The concentration of the metal needs to be at a level that achieves the desired loading of the metal in the aluminosilicate zeolite in a single step. The concentration of the metal in solution can vary over a wide range depending upon solubility of the metal containing compound in water, the presence of other water soluble materials, the concentration of extra-frame metal-containing aluminosilicate zeolite needed in washcoat mixture C, which is used as, or to form, a washcoat. The concentration of the metal containing compound or metal in reactant mixture A at the temperature of the formation of reactant mixture A or the temperature of the reaction to form product mixture B, a reaction solution, can range from 0.01 to 2.5 molar, preferably from 0.05 to 2 molar, more preferably from 0.05 to 1 molar, even more preferably from 0.075 to 0.5 molar.

Step (a) requires that reactant mixture A does not comprise ammonia, ammonium hydroxide or an ammonium salt. The use of ammonia, ammonium hydroxide or an ammonium salt can result in the formation of ammonium complex with the metal. For some metals, the complex can increase the metal concentration in solution. If the pore size of the aluminosilicate zeolite is large enough, exchange of the metal could be improved. However, for small pore aluminosilicates zeolites, the increased radius of the complex can prevent its exchange. If metal complex is too large, then there is an increase in the concentration of the metal in solution. If the formation of the complex is more thermodynamically stable, then there is an increase in the concentration of the metal in solution.

This can also be viewed as a concern with back exchange and a competition between ammonium and the desired metal cations. The presence of an ammonia complex can change the amount of exchanged metal that is exchanged into an aluminosilicate zeolite.

In the first part of the process, whether batch or continuous, the aluminosilicate zeolite is dispersed into, or mixed with a solution, slurry or suspension of the metal containing compound or free metal with water.

In a batch process, the aluminosilicate zeolite, preferably as a dry powder/crystals or a slurry, can be dispersed into, or mixed with a solution, slurry or suspension comprising the metal containing compound or free metal.

In a continuous process, this dispersing or mixing can be done using an in-line continuous mixing system. Examples of such mixers in the Silverson in-line LS series mixer, an Admix Fastfeed in-line mixer, Ystral Conti TDS mixer, IKA MHD 2000 in-line mixer and the Arde Barinco Dispershear. Preferably the metal containing compound is in a solution that can be accurately dosed to the mixer, preferably using a rotor stator pump, and the zeolite powder can be accurately dosed to the mixer, preferably using a loss-in-weight powder feeder system. This ensures the output slurry from the mixer has a controlled solids concentration and metal ion concentration. When the salt is a slurry or a suspension, it can be accurately dosed to the mixer, preferably using a rotor stator pump, and the zeolite powder can be accurately dosed to the mixer, preferably using a loss-in-weight powder feeder system. This ensures the output slurry from the mixer has a controlled (a) solids concentration and (b) metal ion concentration.

A mixture of the $H^+$-form of the aluminosilicate zeolite and a solution, slurry or suspension of a metal containing compound or free metal of the metal to be incorporated into the aluminosilicate zeolite is formed.

The $H^+$-form of the aluminosilicate zeolite, the metal containing compound or free metal and water may be added together in any order. The $H^+$-form aluminosilicate zeolite can be added as a powder or a mixture with water, either as a slurry or a suspension, to a solution/mixture, preferably an aqueous solution/mixture of a metal containing compound or free metal or combination, of salts of the metal.

The aqueous solution, slurry or suspension of the metal containing compound or free metal can be at the temperature at which the metal exchange reaction is going to be performed, between 10° C. and 90° C.

Alternatively, a solution, slurry or suspension of the metal containing compound or free metal, preferably an aqueous solution, can be added to a mixture of the $H^+$-form aluminosilicate zeolite in water or solid $H^+$-form aluminosilicate zeolite. Depending upon the metal containing compound or free metal and the zeolite, the solution, slurry or suspension of the metal containing compound or free metal can be cooled to about 10° C. to below room temperature (about 30° C.), be at room temperature (about 30° C.), or heated to a temperature from above room temperature (about 30° C.) to about 90° C., preferably about 50 to about 75° C., even more preferably about 55 to about 70° C., before adding the $H^+$-form aluminosilicate zeolite to a solution, slurry or suspension of the metal containing compound or free metal or a solution, slurry or suspension of the metal containing compound or free metal can be added to the $H^+$-form aluminosilicate zeolite.

Reactant mixture A has a pH that is dependent upon the aluminosilicate zeolite, the metal containing compound or free metal and the concentration of the aluminosilicate zeolite and the metal containing compound or free metal.

The step of forming reactant mixture A can further comprise adjusting the pH of reactant mixture A by the addition of a base. The base can be an inorganic base, preferably a metal hydroxide, or an organic base, preferably an alkyl ammonia hydroxide, wherein the alkyl ammonia hydroxide comprises four to sixteen carbon atoms.

The pH of reactant mixture A can be adjusted to be more basic to allow for increased metal loading into the zeolite in the metal exchange in step b). The step of adjusting the pH of reactant mixture A can comprise providing an amount of base so that the concentration of hydroxide ions in solution is greater than or equal to the concentration of the metal in solution.

The step of adjusting the pH of reactant mixture A can comprise adding a sufficient amount of base to remove the amount of free metal in solution to less than 10% of the total metal, preferably less than 5%, more preferably less than 1%.

Step (b) Reacting the Metal with the Aluminosilicate Zeolite in a $H^+$-Form in Reactant Mixture a and Forming a Product Mixture B Comprising the Extra-Framework Metal-Containing Aluminosilicate Zeolite In the second part of the process, an ion exchange reaction is used to incorporate the metal into the aluminosilicate zeolite to form an extra-framework metal-containing aluminosilicate zeolite.

The step of reacting the metal with the aluminosilicate zeolite in a $H^+$-form in reactant mixture A and forming a product mixture B comprising the extra-framework metal-containing aluminosilicate zeolite comprises mixing reactant mixture A at a temperature and for a period of time that is sufficient for the reaction to provide the desired metal loading on the aluminosilicate zeolite.

Mixing

Reactant mixture A, a slurry or suspension, can be adequately mixed to provide a product mixture B having good mixing and to prevent solid sedimentation. One skilled in the art would be aware of the devices and techniques that can be used to provide such mixing.

Reaction Temperature

The step of reacting reactant mixture A to form the extra framework metal-containing aluminosilicate zeolite can comprise cooling or heating the reactant mixture to a temperature between 10° C. and 90° C.; preferably between 20° C. and 85° C.; more, preferably between 25° C. and 75° C., most preferably between 30° C. and 75° C. When the metal containing compound in reactant mixture A comprises copper acetate, the reactant mixture A should be heated to a temperature between 40° C. and 85° C., more, preferably between 55° C. and 75° C.

The step of reacting reactant mixture A to form the extra-framework metal-containing aluminosilicate zeolite can comprise mixing reactant mixture A at a temperature that does not use heating, for example, ambient temperature. In some situations, reactions can be performed at temperatures that require cooling, such as 10-12° C. The step of reacting reactant mixture A to form the extra-framework metal-containing aluminosilicate zeolite can be performed at ambient temperature or a temperature than requires cooling.

Time for the Metal Exchange or Reaction

The length of time sufficient to form a mixture comprising the metal-containing aluminosilicate zeolite is dependent on one or more of the aluminosilicate zeolite, the SAR of the aluminosilicate zeolite, the aluminosilicate zeolite type, the particle size(s) of the aluminosilicate zeolite, the desired metal loading, the metal-salt, the temperature at which the reactant mixture A is heated, and the concentration of the reactants.

The reaction time for the metal to exchange into extra-framework positions in the aluminosilicate zeolite during contacting the aluminosilicate zeolite with a solution, slurry or suspension of the metal containing compound or free metal can be between about 1 minute to about 24 hours, preferably between about 5 minutes to about 18 hours, more preferably between about 15 minutes to about 12 hours, from about 10 minutes to about 5 hours, of about 10 minutes to about 3 hours, from about 10 minutes to about 1 hour.

pH: Use of Basic Additives

The pH of reactant mixture A can be in the range of about 4 to about 7, preferably in the range of about 5 to about 7, and in even more preferably in the range of about 5 to about 6.

Depending on the starting materials employed, it may be necessary to adjust the pH of the slurry or suspension so that the pH of reactant mixture A has above-described values. The pH can be adjusted to the above-described values using a base, wherein the base is an inorganic base, preferably a metal hydroxide, or an organic base, preferably an alkyl ammonia hydroxide, wherein the alkyl ammonia hydroxide comprises four to sixteen carbon atoms. Preferably the base is an alkyl ammonium hydroxide.

Percentage Uptake

The percentage uptake is a measure of the amount of metal transferred from the metal containing compound or the free metal into the aluminosilicate zeolite as an extra-framework metal. The percentage uptake is defined as the number of moles of metal in, or on, the aluminosilicate zeolite/number of moles of metal in starting solution×100. The percentage uptake is the total amount of the metal exchanged into, and adsorbed onto, the aluminosilicate zeolite. The percentage uptake can range from about 80% to about 98% depending upon the source of the aluminosilicate zeolite used, reaction temperature and reaction time. The percentage metal uptake can be at least about 80%, preferably at least about 85%, more preferably at least about 90%, most preferably at least about 92%.

Cooling Product Mixture B

When the reaction is performed at room temperature (up to 40° C.), cooling of the product mixture B after the metal exchange is not required.

When the reaction is performed at a temperature above room temperature (greater than 40° C.), the product mixture B should be cooled to room temperature (up to 40° C.) before the mixture of the extra-framework metal-containing aluminosilicate zeolite is used to produce a washcoat, or is further processed for other uses.

In a batch process, reactant mixture A is mixed at a temperature that does not use heating, or at a temperature as described above, until uptake of the metal by the zeolite reaches the desired amount.

In a continuous process, the output slurry from the first part of the continuous process can be continuously fed into a thermally controlled mixer-reactor system in order to carry out the ion exchange reaction. Typical mixer-reactors that could be used for this are a tubular reactor, a continuous stirred flow reactor or a baffled reactor such as an oscillatory baffled reactor, a spinning disc reactor or a spinning cone reactor. These reactors can have different types of mixer internals which are chosen and optimised depending on the mixing duty required here. Typically, a thermally controlled system of pipework of the desired length containing static mixing elements can be used for the duty provided that the slurry has a residence time in the reactor to ensure the ion-exchange reaction has been completed, which can be confirmed by analysis. Reactant mixture A, the output slurry of the first part of the continuous process, can be pumped through the pipework at a controlled desired rate in order to achieve reaction completion within the length of the pipework. Static mixing elements within the pipework can ensure good mixing of the slurry and prevent sedimentation of the zeolite and any other non-soluble components. The outside of the pipework can be temperature controlled by an external heating system to ensure that there is sufficient heat transfer across the pipework and the slurry in the reactor obtains the required set-point temperature for the desired ion exchange. At the end of the pipework, the slurry can be cooled by cooling the external surfaces of the pipework.

When product mixture B (comprising the extra framework metal-containing aluminosilicate zeolite) has been heated, the process can further comprise the step of (c) cooling the mixture formed in step (b) to room temperature.

Extra-Framework Metal-Containing Aluminosilicate Zeolites

Extra-framework metal-containing aluminosilicate zeolites obtained/obtainable by the above described process can have the composition described below.

Metal Ions Versus Metal Oxide

Extra-framework metal-containing aluminosilicate zeolites obtained/obtainable by the above described process can have a weight ratio of exchanged metal to metal oxide of $\geq 1$, $\geq 2$, $\geq 3$, $\geq 4$, $\geq 5$, $\geq 6$, $\geq 7$, $\geq 8$, $\geq 8.5$, or $\geq 9$, measured after calcination of the aluminosilicate zeolite at 450° C. in air for 1 hour.

Wt. % Metal

The target loading of the metal in the extra-framework metal-containing aluminosilicate zeolite obtained/obtainable by the above described process, calculated as the oxide of the metal can be $\leq 10$ wt %, $\leq 9$ wt %, $\leq 8$ wt %, $\leq 7$ wt %, $\leq 6$ wt %, $\leq 5$ wt %, $\leq 4$ wt %, or $\leq 3$ wt %, depending upon the metal and the aluminosilicate zeolite. The oxide of the metal can be in the form MO, $M_2O$, or $M_xO_y$, depending upon the metal. For example, when the metal is copper, the oxide of the metal is CuO. When the metal is iron, the oxide of the metal is $Fe_2O_3$. One skilled in the art would recognize that the target loading is dependent upon the aluminosilicate zeolite, the metal and intended use of the extra-framework metal-containing aluminosilicate zeolite For example, when the metal-containing aluminosilicate zeolite is used to treat exhaust gases comprising a mixture of NOx and $N_2O$, the target loading for the metal on the aluminosilicate zeolite may differ depending upon the concentration of NOx and $N_2O$ in the exhaust gas, since different loadings of the metal can be selected to target the reduction of NOx and $N_2O$.

Free Metal

In addition to metal that is exchanged to increase the level of the metal associated with the exchanged sites in the structure of the aluminosilicate zeolite, non-exchanged metal, generally in the form of metal oxides or hydroxides, may be present on the surface of the aluminosilicate zeolite, as so called free metal. In some aspects of the invention, free metal is not present on the aluminosilicate zeolite.

Metal/Al

The atomic ratio of the metal to aluminum in the metal-containing aluminosilicate zeolite obtained/obtainable by the above described process can be from about 0.05 to 1.4, preferably from about 0.25 to about 0.7.

The extra-framework metal-containing aluminosilicate zeolite can be dried and/or treated and used as is known in compositions and processes that are known for use with extra-framework metal-containing aluminosilicate.

The processes described above can eliminate many of the post-treatment processes needed when traditional ion-exchange methods are used. After the extra-framework metal-containing aluminosilicate zeolite is formed, the aluminosilicate zeolite can be processed to obtain purified aluminosilicate zeolite, preferably in solid form, using methods known to one skilled in the art. Preferably, product mixture B, containing the aluminosilicate zeolite, can be used directly, without isolation or purification, to form a washcoat that can be applied to a substrate used in purifying exhausts from engines. It is not necessary to separate the extra-framework metal-containing aluminosilicate zeolite from the mother liquor resulting from the metal incorporation.

2. Forming a Washcoat Comprising Product Mixture B, Comprising an Extra-Framework Metal-Containing Aluminosilicate Zeolite A process for the preparation of a washcoat comprising an extra-framework metal-containing aluminosilicate zeolite, comprises:

(a) providing a product mixture B, comprising an extra-framework metal-containing aluminosilicate zeolite as described above; and
(b) combining product mixture B with a binder, a rheology modifier, or a mixture of a binder and a rheology modifier to form washcoat mixture C, the washcoat.

Washcoat mixture C comprises product mixture B, comprising an extra-framework metal-containing aluminosilicate zeolite, and one or more of a binder and a rheology control agent. Three different processes, which use the same materials, can be used to form the washcoat. The first process combines a binder and the extra-framework metal-containing aluminosilicate zeolite, and then a rheology modifier is added. The second process combines a rheology modifier and the extra-framework metal-containing aluminosilicate zeolite, and then a binder is added. The third process combines a binder and a rheology modifier with the extra-framework metal-containing aluminosilicate zeolite, where the binder and the rheology modifier can be added together as a mixture or as two separate materials at the same time.

In each of these processes, when two materials are being combined, they can be combined in either order. For example, product mixture B can be combined with a mixture/solution of a binder by either adding product mixture B to a mixture/solution of a binder or by adding a mixture/solution of a binder to product mixture B. The binder can be added as a powder or an aqueous slurry.

Binder

A binder, also known as a binding agent, is a material used to hold or draw other materials in the washcoat together and to the substrate to which it will be applied.

The binder can comprise alumina, aluminum hydroxide, $TiO_2$, $SiO_2$, $ZrO_2$, $CeZrO_2$, $SnO_2$, an aluminophosphate, non-zeolitic aluminosilicate, silica-alumina, clays or mixtures thereof.

The binder can be added in the form of a powder or in a slurry to the mixture comprising the extra-framework metal-containing aluminosilicate zeolite to product mixture B, or a mixture comprising product mixture B and a rheology modifier, to form washcoat mixture C, a washcoat.

The binder can be added in an amount that is 1 to 20% of total solids, preferably 1 to 15% of total solids, more preferably 1 to 10% of total solids, of washcoat mixture C.

The binder can be added in an amount that is 1 to 10%, preferably 1 to 5%, by weight of the product mixture B, the reaction mixture.

Rheology Modifier

The rheology modifier can comprise a polysaccharide, a starch, a cellulose, an alginate, a cellulose (i.e. cellulosic), carboxymethyl cellulose, hydroxymethyl cellulose, hydroxyethyl cellulose, methyl cellulose, methyl hydroxyethyl cellulose, methyl hydroxypropyl cellulose and ethyl hydroxyethyl cellulose carboxymethyl cellulose, hydroxymethyl cellulose, hydroxyethyl cellulose, methyl cellulose, methyl hydroxyethyl cellulose, methyl hydroxypropyl cellulose and ethyl hydroxyethyl cellulose, and a mixture thereof.

The rheology modifier can comprise a clay, such as laponite, kaolin, bentonite or an organoclay.

The rheology modifier can comprise at least one polysaccharide selected from the group consisting of a galactomannan gum, xanthan gum, curdlan, Schizophyllan, Scleroglucan, Diutan gum, Welan gum and mixtures of any two or more thereof. For embodiments where the washcoat requires low pH and high temperature stability, the rheology modifier preferably comprises Scleroglucan and/or Schizophyllan, with Scleroglucan being particularly preferred.

The polysaccharide rheology modifier can be a starch, a cellulose or an alginate or is derived from a starch, a cellulose (i.e. cellulosic) or an alginate, though these rheology modifiers do not share all of the properties of scleroglucan, welan gum and diutan gum, e.g. hydroxyethyl cellulose may degrade on heating even at neutral or basic pH.

The cellulosic rheology modifier may be selected from the group consisting of carboxymethyl cellulose, hydroxymethyl cellulose, hydroxyethyl cellulose, methyl cellulose, methyl hydroxyethyl cellulose, methyl hydroxypropyl cellulose and ethyl hydroxyethyl cellulose.

The polysaccharide rheology modifier may be an associative rheology modifier, cellulosic examples of which include hydrophobically modified hydroxyethyl cellulose or hydrophobically modified ethyl hydroxyethyl cellulose.

It is possible according to the invention to use a single rheology modifier as defined herein, or a mixture or any two or more thereof. For example, in one embodiment, the at least one rheology modifier can be a mixture of guar gum and xanthan gum.

The rheology modifier in the form of a powder or as a slurry with water can be added to product mixture B or a mixture comprising product mixture B and a binder to form washcoat mixture C.

The rheology modifier can be added in an amount that is 0.05 to 10% of total solids, preferably 0.05 to 5% of total solids, more preferably 0.05 to 3% of total solids.

The rheology modifier can be added in an amount that is 0.1 to 10%, preferably 0.1 to 5%, by weight of product mixture B, comprising an extra-framework metal-containing aluminosilicate zeolite.

Process of Forming Washcoat Mixture C

Washcoat mixture C, comprises: a mixture of (a) product mixture B, comprising an extra-framework metal-containing aluminosilicate zeolite, and (b) one or more of a binder and a rheology control agent.

When washcoat mixture C comprises (i) product mixture B and (ii) a binder or a rheology modifier, the binder or the rheology modifier can be added directly to product mixture B, or product mixture B can be added directly to the binder or the rheology modifier. Preferably, the binder or the rheology modifier is present as a solution, a slurry or a suspension.

When washcoat mixture C, comprises (i) product mixture B and (ii) a binder and a rheology modifier, three different processes, which use the same materials, can be used to form the washcoat. The first process combines a binder and product mixture B, and then a rheology modifier is added. The second process combines a rheology modifier and product mixture B, and then a binder is added. The third process combines a binder and a rheology modifier with product mixture B, wherein the binder and the rheology modifier can be added together as a mixture or as two separate materials at the same time. In each of these processes, when two materials are being combined, they can be combined in either order. For example, product mixture B can be combined with a mixture/solution of a binder by either adding product mixture B to a mixture/solution of a binder or by adding a mixture/solution of a binder to product mixture B. The binder or the rheology modifier can be added to product mixture B as a solution, a slurry or a suspension. Alternatively, Product mixture B can be added to a solution, a slurry or a suspension of the binder or the rheology modifier. These processes provide flexibility needed by one skilled in the art.

In each of these three processes, the extra-framework metal-containing aluminosilicate zeolite can be provided as the cooled, or non-heated, product mixture B, a product mixture resulting from the reaction to incorporate the metal from the metal containing compound or free metal into extra-framework sites in the aluminosilicate zeolite when the mixture formed after the reaction will be directly used in producing a washcoat. Alternatively, product mixture B, formed after the reaction to incorporate the metal from the metal containing compound or free metal into extra-framework positions in the aluminosilicate zeolite, can be treated to change the concentration of the extra-framework metal-containing aluminosilicate zeolite in the mixture by changing the amount of water in the mixture. Generally, changes in the amount of water are performed to obtain a solid material or a more concentrated solution.

In each of these three processes, the pH of one or more of the solutions, slurries or suspension containing the extra-framework metal-containing aluminosilicate zeolite, the binder and the rheology modifier can be adjusted by the addition of a base. The base can be an inorganic base, preferably a metal hydroxide, or an organic base, preferably an alkyl ammonia hydroxide, wherein the alkyl ammonia hydroxide comprises four to sixteen carbon atoms. Preferably the base is an alkyl ammonium hydroxide. The alykl ammonium hydroxide can be at least one of tetramethylammonium hydroxide (TMAOH), tetraethylammonium hydroxide (TEAOH), tetrapropylammonium hydroxide (TPAOH) and tetrabutylammonium hydroxide (TBAOH). Unlike steps a) and b) involved in the formation of the extra-framework metal-containing aluminosilicate zeolite, the base can comprise ammonia or an ammonium ion. In an embodiment, washcoat mixture C does not comprise ammonia or an ammonium ion.

The process can further comprise the step of adjusting the pH of washcoat mixture C by adding a base. The amount of base added can be based on amount of metal in solution. The concentration of added $OH^-$ can be greater than the concentration of free metal in solution, but the ratio of added $OH-$: free metal should be less than or equal to 2:1. A base can be added to one or more of product mixture B, the binder, the theology modifier or a combination of two or more thereof. A base can be added after, or concurrently with, the addition of the binder or the rheology modifier. When the binder and rheology modifier are being added in separate input streams, the base can be added with either of these input streams or in a separate input stream.

When a continuous process has been used to form product mixture B, a reaction mixture, product mixture B can be combined with one or more of a binder and a rheology control agent. This can be performed in either a batch or continuous process using mixing techniques known in the art.

A washcoat comprising, or consisting essentially of, product mixture B and one or more of the binder and rheology modifier can be applied to a substrate using procedures well known to one skilled in the art. Preferably, the method used to apply the washcoat to the substrate is selected from a method described in WO9947260, WO2011080525, or WO2014195685, which are incorporated by reference.

The substrate, a ceramic or metallic monolith, can be a filter with low or high porosity. The substrate can be a flow through or wall-flow filter with low or high porosity. Preferably the filter is a wall-flow filter. Preferably the filter has a high porosity. The term "high porosity substrate" refers to a substrate having a porosity of between about 40 and about 80%. The high porosity substrate can have a porosity preferably of at least about 45%, more preferably of at least about 50%. The high porosity substrate can have a porosity preferably of less than about 75%, more preferably of less than about 70%. The term porosity, as used herein, refers to the total porosity, preferably as measured with mercury porosimetry. The porosity is measured on an uncoated substrate.

The method can further comprise the steps of drying and calcining the substrate comprising a washcoat comprising product mixture B.

Calcination of the washcoated substrate can be performed at a temperature in the range of up to about 850° C. The calcination can be carried out stepwise at successive temperatures. The term "stepwise at successive temperatures" means that the washcoated substrate to be calcined is heated to a certain temperature, kept at this temperature for a certain time and heated from this temperature to at least one further temperature and kept there in turn for a certain time. By way of example, a stepwise calcination of is described in WO2009/141324 (also published as U.S. Pat. No. 8,715,618), which is incorporated by reference.

The calcination can be affected in any suitable atmosphere, such as, for example, air, lean air depleted in oxygen, oxygen, nitrogen, water steam, synthetic air, carbon dioxide. Preferably the calcination is performed under air. The calcination can be carried out in a dual mode, i.e. a mode comprising a first calcination in an oxygen-reduced or oxygen-free atmosphere, and a second mode comprising a second calcination in air, an oxygen-enriched or pure oxygen atmosphere. The humidity of the atmosphere can be controlled.

One of the major advantages of the use of the processes described herein is the reduction in energy used that results from only having to perform one calcination on the washcoated substrate. Other methods currently used require at least two calcinations: one to calcine the metal-containing aluminosilicate zeolite and a second to calcine the washcoated support. These energy savings can be significant, especially considering the temperatures involved and the length of time the materials are calcined.

Other energy savings are found by being able to directly use the extra-framework metal-containing aluminosilicate zeolite in a washcoat instead of having to wash the metal-containing aluminosilicate zeolite when traditional ion exchange methods are used. In addition, energy required for isolation of the metal-containing aluminosilicate zeolite in currently used methods is not needed when the methods described herein are used.

Product-by-Process

The present invention also relates to extra-framework metal-containing aluminosilicate zeolites obtainable or obtained by above-described process.

The following examples shall further illustrate the process and the materials of the present invention.

EXAMPLES

Applicants have discovered that the use of an aluminosilicate zeolite in a $H^+$-form provides a single step extra-framework metal exchange that provides higher metal loading than the use of NH₄-forms of an aluminosilicate zeolite. This is shown below in Example 1.

Example 1

The exchange of copper into a commercially available NH₄ form of CHA, the NH₄ form of CHA converted in-situ into the H⁺-form of CHA by treatment with acid, and samples of commercially available H⁺-form of CHA were evaluated by determining the amount of copper uptake from a copper acetate solution at 65° C. to provide a copper zeolite with 2.4 wt. % copper. The solids content was about 38%.

The same method was used as described above, except the initial concentration of copper in solution was 3.3%.

|  | Pretreatment | Cu uptake (%) |
| --- | --- | --- |
| CHA form - 2.4 wt % Cu |  |  |
| NH₄⁺, SAR 17 | None | 65 |
| NH₄⁺ → H⁺, SAR 17 | 500° C./2 h | 83 |
| NH₄⁺ → H⁺, SAR 25 | 500° C./2 h | 83 |
| H⁺ (Commercial Source 1) SAR 23 | None | 98 |
| H⁺ (Commercial Source 2) SAR 23 | None | 96 |
| CHA form - 3.3 wt % Cu |  |  |
| NH₄⁺ → H⁺, SAR 17 | 500° C./2 h | 70 |
| H⁺ (Source 1) SAR 23 | None | 95 |
| H⁺ (Source 2) SAR 23 | None | 94 |

The SAR values in the samples above were determined before calcination and the subsequent ion exchange. There was a slight reduction (2-3%) in the % of Cu uptake using the H⁺ form. When the ammonia form was used, there was a slight increase (5%) in the % of Cu uptake. The H⁺ form provides more consistent results than the NH₄ form.

Example 2—Cu Salt Versus Cu Salt Mixtures

Copper was exchanged into a H⁺ form of CHA with SAR 22, using a single copper salt or a blend of copper salts. The content of each copper salt was measured by the percentage of total copper metal available for exchange. Copper acetate was used as a primary copper source and secondary sources, copper carbonate or copper hydroxide, were blended in. H⁺ form of CHA and the Cu salt(s) were added to deionized water and the system was heated to 65° C. while mixing. The reaction mixture was held at 65° C. for 5 hours, at which point it was cooled to room temperature and samples for analysis were taken.

The table below shows copper uptakes for a copper-aluminosilicate zeolite produced in the procedure described above with a variety of copper salt blends. Copper carbonate and copper hydroxide both showed improved copper uptake when added with copper acetate over copper acetate alone.

| Primary Copper Salt | Secondary Copper Salt | Cu uptake (%) |
| --- | --- | --- |
| 100% Cu(OAc)₂ | — | 91 |
| 66.7% Cu(OAc)₂ | 33.3% CuCO₃ | 94 |
| 66.7% Cu(OAc)₂ | 33.3% Cu(OH)₂ | 94 |

Example 3

Same as Example 2, except AEI with a SAR of 20 and 3.75% copper, was used instead of CHA, the temperature was 70° C., and the fraction of copper from copper hydroxide varied from 0 to 66.7%.

The table below shows copper uptakes for various fractions of copper hydroxide blended with copper acetate. As copper hydroxide fraction increases, even beyond a 50:50 ratio, copper uptake improves over copper acetate alone.

| Primary Copper Salt | Secondary Copper Salt | Cu uptake (%) |
| --- | --- | --- |
| 100% Cu(OAc)₂ | — | 90 |
| 66.7% Cu(OAc)₂ | 33.3% Cu(OH)₂ | 93 |
| 66.7% Cu(OH)₂ | 33.3% Cu(OAc)₂ | 95 |

Example 4

The exchange of different amounts of manganese into the H⁺ form of AFX with SAR 10, using a single manganese salt, was investigated at 50 and 80° C. Solids were added to deionized water and the system was heated to 80° C. while mixing. It was held at temperature for 2 hours, at which point it was cooled to room temperature and samples for analysis were taken.

The table below shows manganese uptakes for different temperature and weight-percent combinations. When the metal is manganese, reaction temperature is important as higher temperatures improve manganese uptake. Excess manganese in solution reduces the uptake compared with lower weight-percentages.

| Manganese Conc. | Temperature | Cu uptake (%) |
| --- | --- | --- |
| 3.33% Mn | 50° C. | 43 |
| 3.33% Mn | 80° C. | 86 |
| 4.33% Mn | 50° C. | 34 |
| 4.33% Mn | 80° C. | 75 |

Example 5

Samples of CuCHA with Cu loadings of 2.4% Cu (low loading) and 3.3% Cu (high loading). Samples were aged under the conditions below the tested to determine the amount of NOx conversion that results from the use of these samples at various temperatures.

Figure 1:
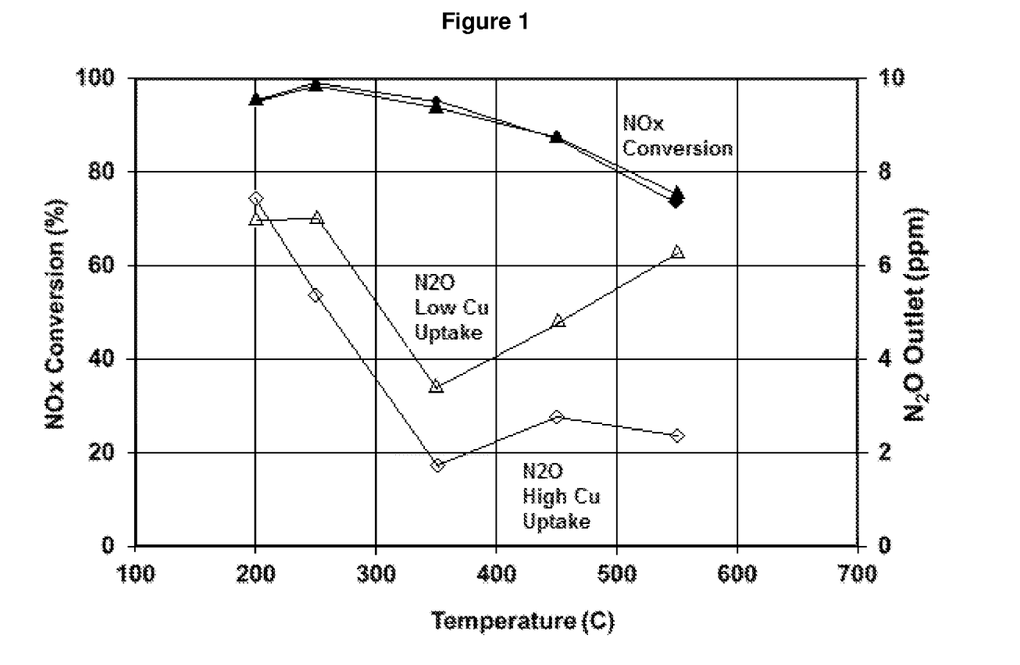
FIG. 1 shows steady state NOx conversion and $N_2O$ concentration from samples prepared by the methods described herein after mild hydrothermal aging (620° C./100 h/10% $H_2O$).
Figure 2:
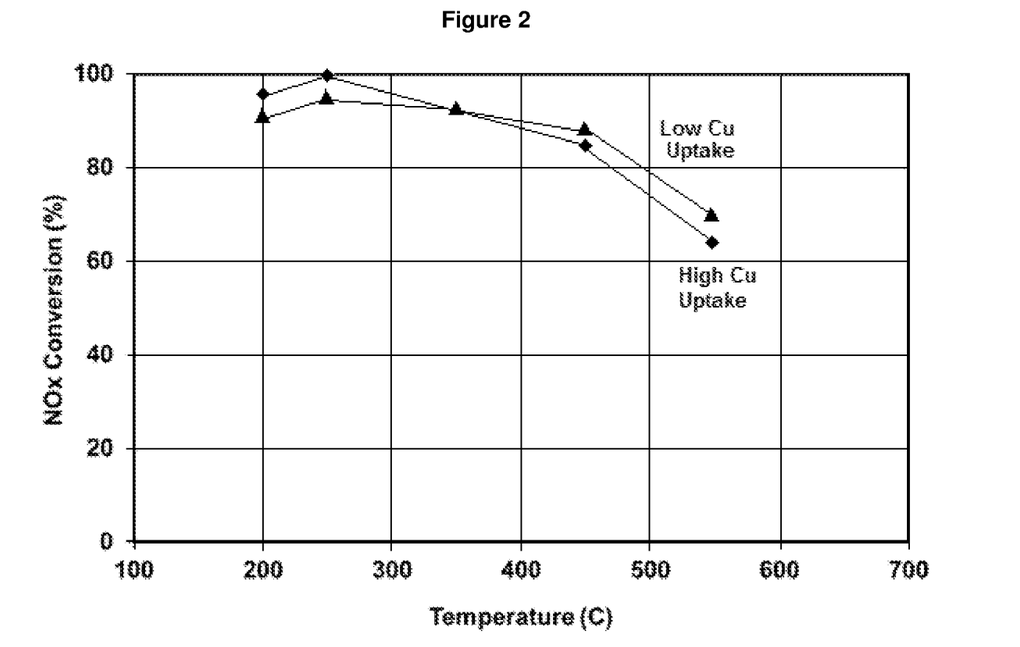
FIG. 2 shows steady state NOx conversion from samples prepared by the methods described herein after moderate hydrothermal aging (750° C./80 h/10% $H_2O$).
Figure 3:
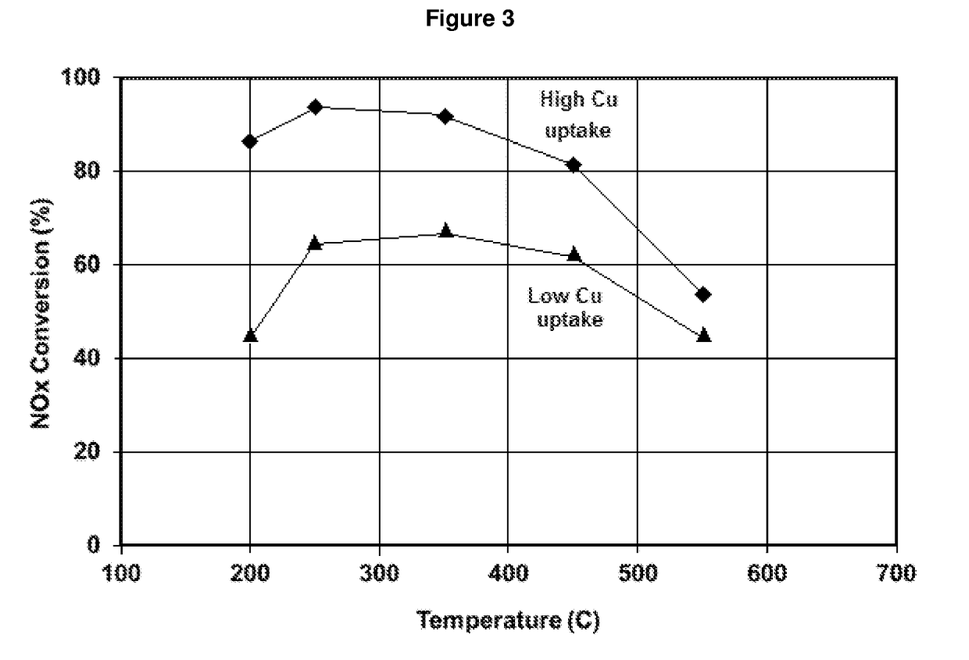
FIG. 3 shows steady state NOx conversion from samples prepared by the methods described herein after severe hydrothermal aging (900° C./4 h/4.5% $H_2O$).

Fresh
Moderate: 750° C./80 h/10% H₂O
Severe: 900° C./4 h/4.5% H₂O
Mild: 620° C./100 h/10% H₂O When evaluated fresh (not shown), NOx conversion from the low loading sample at 200° C. was higher than 90% at a space velocity of 50,000 h⁻¹ and an NH₃ to NOx ratio of 1 suggesting adequate Cu exchange for the SCR reaction. After mild (620° C./100 h/10% H₂O, FIG. 1) and moderate (750° C./80 h/10% H₂O, FIG. 2) hydrothermal aging, steady state NOx conversion using the low loading samples was similar in performance to that of the high loading. However, the N₂O formation from the low concentration samples was higher above 350° C. Following severe hydrothermal aging (900° C./4 h/4.5% H₂O, FIG. 3), the low loading catalyst showed significant deactivation relative to the high loading sample.

The invention claimed is:
1. A process for the preparation of an extra-framework metal-containing aluminosilicate zeolite, the process comprising:
(a) forming a reactant mixture A comprising (i) an aqueous slurry of an aluminosilicate zeolite in a H⁺-form, and (ii) a metal containing compound or free metal, wherein the mixture does not comprise ammonia, ammonium hydroxide or an ammonium salt, and (b) reacting the metal with the H+-form aluminosilicate zeolite in reactant mixture A and to form a product mixture B comprising the extra-framework metal-containing aluminosilicate zeolite, wherein the metal comprises one or more of copper, manganese, nickel and palladium; and the step of reacting the metal with the aluminosilicate zeolite in a H+-form is performed in a single exchange and after forming product mixture B, the extra-framework metal-containing aluminosilicate zeolite is not separated from the mixture after the reaction.

2. The process of claim 1, wherein the metal containing compound or free metal of reactant mixture A further comprises an iron salt.

3. The process of claim 1, wherein reactant mixture A has a pH and the step of forming reactant mixture A further comprises adjusting the pH of reactant mixture A by the addition of a base, wherein the base is a metal hydroxide.

4. The process of claim 1, wherein the process further comprises adjusting the pH of product mixture B by the addition of base to increase an amount of extra-framework metal present in the extra-framework metal-containing aluminosilicate zeolite.

5. The process of claim 1, wherein the reactant mixture A comprises between 5% to 50% by weight of the extra-framework metal-containing aluminosilicate zeolite.

6. The process of claim 1, wherein the step of reacting the reactant mixture A to form the extra-framework metal-containing aluminosilicate zeolite comprises mixing the reactant mixture at ambient temperature, or at a temperature that requires subsequent cooling of product mixture B.

7. The process of claim 1, wherein the step of reacting reactant mixture A to form the extra framework metal-containing aluminosilicate zeolite comprises reacting reactant mixture A at a temperature from 10-30° C.

8. The process of claim 1, wherein the step of reacting the reactant mixture A to form the extra framework metal-containing aluminosilicate zeolite comprises heating the reactant mixture A to a temperature between 30° C. and 90° C.

9. The process of claim 1, wherein when the metal containing compound comprises copper acetate and reactant mixture A is heated to between 40° C. and 85° C.

10. The process of claim 1, further comprising the step of:
(c) cooling the mixture formed in step (b) to room temperature.

11. The process of claim 1, wherein the aluminosilicate zeolite is treated before step a, wherein the treatment changes one or more of the particle size of the aluminosilicate zeolite, the particle size distribution of the aluminosilicate zeolite, or the acidity of the aluminosilicate zeolite; or wherein the aluminosilicate zeolite is subject to other forms of dealumination, including hydrothermal treatment.

12. A process for the preparation of a washcoat comprising an extra-framework metal-containing aluminosilicate zeolite, the process comprising:

(a) providing product mixture B comprising the extra-framework metal-containing aluminosilicate zeolite according to the process of claim 1, and (b) combining product mixture B with a binder, a rheology modifier, or a mixture of a binder and a rheology modifier to form washcoat mixture C.

13. The process of claim 12, wherein washcoat mixture C has a pH and the process further comprises the step of adjusting the pH of washcoat mixture C by adding a base.

14. The process of claim 13, wherein the step of adjusting the pH of washcoat mixture C is performed after or concurrently with the addition of the binder, the rheology modifier or a combination of the binder and the rheology modifier.

15. The process of claim 12, wherein the binder is added as a powder or a slurry to product mixture B comprising an extra-framework metal-containing aluminosilicate zeolite.

16. The process of claim 12, wherein the binder is added in an amount that is 1 to 20% of total solids in washcoat mixture C.

17. The process of claim 12, wherein the binder is added in an amount that is 1 to 10% by weight of the total weight of product mixture B.

18. The process of claim 12, wherein the rheology modifier is added in an amount that is 1 to 20% of total solids in washcoat mixture C.

19. The process of claim 12, wherein the rheology modifier is added in an amount that is 1 to 10% by weight of product mixture B.

20. The process of claim 13, wherein the amount of base added is such that the concentration of OH— in washcoat mixture C is greater than the concentration of the metal in washcoat mixture C.

21. The process of claim 13, further comprising the step of applying washcoat mixture C onto a substrate to form a coated substrate.

* * * * *